J. PORTEOUS.
TRACTION WHEEL.
APPLICATION FILED MAR. 17, 1914.

1,106,841. Patented Aug. 11, 1914.

WITNESSES:
Andrew P. Dron
Anita Gil

INVENTOR.
James Porteous
BY
Francis C. Huebne
ATTORNEY.

UNITED STATES PATENT OFFICE.

JAMES PORTEOUS, OF FRESNO, CALIFORNIA.

TRACTION-WHEEL.

1,106,841.   Specification of Letters Patent.   Patented Aug. 11, 1914.

Application filed March 17, 1914.   Serial No. 825,233.

*To all whom it may concern:*

Be it known that I, JAMES PORTEOUS, a citizen of the United States, and a resident of the city of Fresno, county of Fresno, and State of California, have invented a new and useful Improvement in Traction-Wheels, of which the following is a specification.

My invention relates to an improvement in traction wheels, and its object is to keep the wheels having such improvement thereon from slipping, and from sinking in soft ground.

Such improvement consists of plates or shoes attached to the periphery of the wheel in such manner that the wheel will rest on one or more of said plates at all times during its revolution. Said plates are constructed in such relationship with the adjoining plate that when any plate is resting on the ground, the movement of the wheel in either direction will bring the next adjoining plate to the ground in line with the one upon which the wheel rests, and as such wheel revolves the plates are carried on the periphery thereof thus forming a continuous track upon which such wheel can travel.

Figure 1:
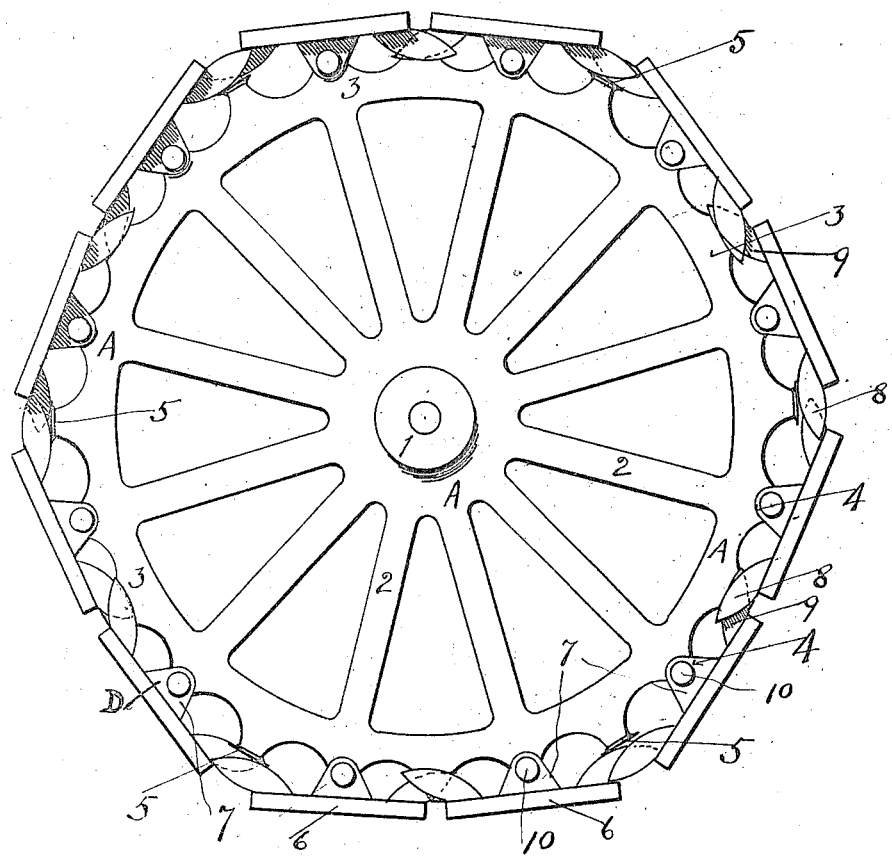
Figure 2:
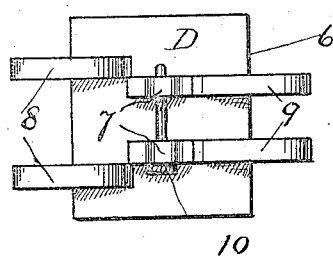
Figure 3:
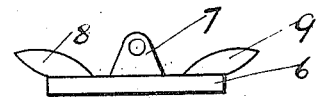
Figure 4:
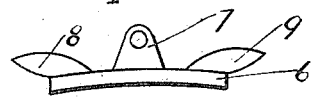

In the drawings which accompany this specification, Figure 1 is a side view of the wheel complete. Fig. 2 is a top view of the shoe, or plate removed from the wheel. Fig. 3 is a side view of Fig. 2. Fig. 4 shows a side view of a modified form of shoe.

In said drawings A is a wheel which can be constructed with an ordinary hub 1 and spoke 2, and having a rim which is preferably constructed with a plurality of transverse pivotal bearings 4, equi-distant apart, and an equal number of bumpers 5 between such pivotal bearings. In my construction I prefer to have such bearings opposite to, or at the end of each spoke. At the pivotal bearings I have increased the thickness of the rim to make such bearings more rigid.

It is herein noted that while the construction above set forth is my preference, the same object can be accomplished by eliminating the rim of the wheel and constructing the pivotal bearings and bumpers on the ends of alternate spokes, and strengthening the wheel by bracing such spokes together, or, an ordinary disk may be used in lieu of a wheel with spokes.

D is a shoe, or plate the base of which is the approximate length of the distance between the centers of contiguous bumpers. This plate is constructed with a bottom 6 the width of the desired tread, and the approximate length of the distance between the centers of any two contiguous bumpers 5, having upright pivotal bearing projections 7 in the center thereof. Such plate is suspended from the rim 3 by means of pin 10 passing through pivotal bearings 7 and 4 and adapted to permit of a rocking motion. On the top of the base of said plate twin parallel upright rear wings 9 are constructed on the upper side and to the rear of such base. They are of such length that when the front end of any plate rests on the bumpers, the wings in the rear rest on the top of the adjoining shoe. I have also constructed on the forward top end of bottom 6 twin parallel upright forward wings 8 placed wide enough apart to permit the rim 3 to pass between them and close enough together to slide between twin wings 9 on the adjacent plate. Wings 9 are of sufficient length that when adjoining plates are rocked so adjacent ends are as far apart as the rocking motion will permit, such wings will rest on the top of bottom 6 and the under side of such wings 8 and 9 are uniformly curved so when any shoe is moved so either end rests on a bumper, the adjacent end of the next shoe is forced to rest on such common bumper.

What I claim as my invention and upon what I desire Letters Patent is:

1. In a traction wheel, the combination of a plurality of bumpers equidistant apart on the periphery thereof, plates having a base the approximate length of the distance between the centers of contiguous bumpers, a pivotal connection joining each of such plates to the rim of such wheel between the bumpers, and adapted to permit such plate to have a rocking motion and for either end to rest on one of such bumpers, a wing extension on each end of such plate on the upper side thereof having a curved under surface which rests on the top of the plate of the adjoining shoe, adapted to force the adjacent ends of adjoining shoes to their common bumper.

2. In a traction wheel, the combination of a plurality of bumpers equidistant apart on the periphery thereof, plates having a base the approximate length of the distance between the centers of contiguous bumpers, a pivotal connection joining each of such plates to the rim of such wheel between the bumpers, and adapted to permit such plate to have a rocking motion and for either end to rest on one of such bumpers, two parallel wing extensions on one end on the upper side of such plate spaced to permit such bumpers to pass between them and two parallel wing extensions on the other end on the upper side of such plate spaced to permit the wings on the adjacent end of the adjoining plate to pass between them, such wings having a curved under surface and adapted to slide on the top of the base of the adjacent end of the adjoining plate, and to draw such adjacent ends of the adjoining plates together to rest on a common bumper.

3. In a traction wheel, the combination of a plurality of bumpers on the periphery of such wheel spaced equidistant apart, plates rockingly pivoted to the rim of such wheel midway between such bumpers, wing extensions on each end of such plates having a curved under surface and adapted to ride on the adjacent end of the adjoining plate such curve being adapted to draw the adjacent ends of adjoining plates to a common bumper as such wheel rolls in either direction over such plates, all substantially as described.

JAMES PORTEOUS.

Witnesses:
ANITA GIL,
A. M. DREW.

Copies of this patent may be obtained for five cents each, by addressing the "Commissioner of Patents, Washington, D. C."